United States Patent
Phan et al.

(10) Patent No.: US 9,621,365 B2
(45) Date of Patent: Apr. 11, 2017

(54) RELAYING MULTICAST DATA IN A WIRELESS NETWORK

(75) Inventors: Mai-Anh Phan, Herzogenrath (DE); Christian Hoymann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 104 days.

(21) Appl. No.: 14/130,949

(22) PCT Filed: Jul. 8, 2011

(86) PCT No.: PCT/EP2011/061709
§ 371 (c)(1),
(2), (4) Date: Jan. 6, 2014

(87) PCT Pub. No.: WO2013/007290
PCT Pub. Date: Jan. 17, 2013

(65) Prior Publication Data
US 2014/0153472 A1   Jun. 5, 2014

(51) Int. Cl.
*H04L 12/18* (2006.01)
*H04L 5/00* (2006.01)
(Continued)

(52) U.S. Cl.
CPC ............. *H04L 12/189* (2013.01); *H04B 7/15* (2013.01); *H04L 5/0032* (2013.01);
(Continued)

(58) Field of Classification Search
None
See application file for complete search history.

(56) References Cited

U.S. PATENT DOCUMENTS 6,873,627 B1 *   3/2005   Miller .................. H04L 1/1614
                                                         370/432
2011/0244788 A1 * 10/2011 Ode ....................... H04B 7/022
                                                         455/7
(Continued)

FOREIGN PATENT DOCUMENTS

WO   WO 2010/073403 A1   7/2010
WO   WO 2010/108364 A1   9/2010

OTHER PUBLICATIONS

O. Queseth: "Reply LS on synchronization requirements between eNB and relay", 3GPP TSG RAN WG1 Meeting #61, Montreal, Canada, May $10^{th}$-$14^{th}$, 2010; R1-103051; Response to R1-100832 :LS on synchronization requirements between eNB and relay, 3GPP TSG-RAN WG4 Ad hoc meeting #10-02 Dublin, Ireland, Apr. $12^{th}$-$16^{th}$, 2010; (Release 10) Source: TSG-RAN WG4, 1 pg.
(Continued)

*Primary Examiner* — Ajay Cattungal
*Assistant Examiner* — Ayanah George
(74) *Attorney, Agent, or Firm* — Myers Bigel, P.A.

(57) ABSTRACT

In order to provide efficient relaying of multicast data in a wireless network, the wireless network comprises a base station and a relay node. The relay node is configured for transmissions on the basis of a radio frame including one or more subframes for unicast transmission and one or more subframes for multicast transmission. In a multicast-only operating mode of the relay node, the base station transmits multicast data to the relay node in one or more subframes which are selectable from the one or more subframes for unicast transmission and the one or more subframes for multicast transmission. The relay node receives the multicast data as transmitted by the base station and transmits the received multicast data in one or more of the subframes for multicast transmission.

19 Claims, 14 Drawing Sheets

(51) Int. Cl.
   *H04B 7/15*   (2006.01)
   *H04B 7/155*  (2006.01)
(52) U.S. Cl.
   CPC .......... *H04L 5/0042* (2013.01); *H04L 5/0044* (2013.01); *H04L 5/0053* (2013.01); *H04L 5/0087* (2013.01); *H04B 7/15542* (2013.01)

(56) References Cited

U.S. PATENT DOCUMENTS

| | | |
|---|---|---|
| 2012/0014286 A1 | 1/2012 | Wang et al. |
| 2012/0020273 A1 | 1/2012 | Mori |

OTHER PUBLICATIONS

ETSI TS 136 216 V10.1.0 (Jan. 2011); Universal Mobile Telecommunications System (UMTS); LTE; Evolved Universal Terrestrial Radio Access (E-UTRA); Physical layer for relaying operation (3GPP TS 36.216 version 10.1.0 Release 10); 650 Route des Lucioles F-06921 Sophia Antipolis Cedex—France; 17 pgs.
3GPP TS 36.211 V10.0.0 (Dec. 2010); 3$^{rd}$ Generation Partnership Project; Technical Specification Group Radio Access Network; Evolved Universal Terrestrial Radio Access (E-UTRA); Physical channels and modulation (Release 10); 650 Route des Lucioles F-06921 Sophia Antipolis Cedex—France; 103 pgs.
3GPP TS 36.300 V10.1.0 (Sep. 2010); 3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10); 650 Route des Lucioles F-06921 Sophia Antipolis Cedex—France; 192 pgs.
International Search Report, PCT/EP2011/061709, Jun. 4, 2012.
Written Opinion of the International Searching Authority, PCT/EP2011/061709, Jun. 4, 2012.
International Preliminary Report on Patentability, PCT/EP2011/061709, Oct. 10, 2013.
First Office Action for corresponding Chinese Application No. 201180072179.6, issued on Nov. 26, 2015 (13 pages).

\* cited by examiner

```
-- ASN1START

MSFN-SubframeConfig ::=        SEQUENCE {
    radioframeAllocationPeriod     ENUMERATED {n1, n2, n4, n8, n16, n12},
    radioframeAllocationOffset     INTEGER (0..7),
    subframeAllocation             CHOICE {
        oneframe                       BIT STRING (SIZE(6)),
        fourFrames                     BIT STRING (SIZE(24))
    }
}

-- ASN1STOP
```

FIG. 8

```
-- ASN1START

RN-SubframeConfig ::=        CHOICE {
    oneFrame                    BIT STRING (SIZE(8)),
    fourFrames                  BIT STRING (SIZE(32))
}

-- ASN1STOP
```

FIG. 9

```
-- ASN1START

RN-SubframeConfig ::=          BIT STRING (SIZE(8))

-- ASN1STOP
```

FIG. 10

RELAYING MULTICAST DATA IN A WIRELESS NETWORK

CROSS REFERENCE TO RELATED APPLICATION

This application is a 35 U.S.C. §371 national stage application of PCT International Application No. PCT/EP2011/061709, filed on 8 Jul. 2011, the disclose and content of which is incorporated by reference herein in its entirety. The above-referenced PCT International Application was published in the English language as International Publication No. WO 2013/007290 A1 on 17 Jan. 2013.

TECHNICAL FIELD

The present invention relates to methods of relaying multicast data in a wireless network and to corresponding devices.

BACKGROUND

In mobile networks, e.g., according to the 3GPP (3rd Generation Partnership Project), it is known to use relaying for improving capacity and/or coverage of the network. For example, in 3GPP LTE (Long Term Evolution) relaying was introduced in the Release 10 Technical Specifications (TSs). The general idea of relaying is that a relay node (RN) receives a transmission from a sender and forwards this transmission to a recipient. For example, a transmission can be received from a base station, in 3GPP LTE referred to as "evolved Node B" (eNB), and be forwarded to a mobile terminal or other type of user equipment (UE), or vice versa. In 3GPP LTE, a RN communicates with its serving eNB, also referred to as donor eNB, via a backhaul link, and provides access to the UEs attached to a relay cell of the RN via an access link. Both the backhaul link and the access link are implemented using the LTE radio interface.

There are basically two different realizations of RNs. First there are RNs, which can separate access and backhaul links sufficiently well, e.g., by means of separated antennas or by means of separated frequency bands, such that they do not have any restrictions on the radio interface of the access or backhaul link. Second, there are RNs whose access and backhaul links would interfere with each other severely such that those RNs require the configuration of access and backhaul subframes in order to separate the signals in the time domain. In configured backhaul subframes, the RN can communicate with the donor eNB and in access subframes it can communicate with the UEs attached to the relay cell. In downlink (DL) backhaul subframes, in which the RN may receive data from its donor eNB, the RN does not transmit the signals that are provided in regular subframes, such as reference signals, to the attached UEs, i.e., UEs in connected mode or UEs in idle mode. As explained in 3GPP TS 36.216, Section 5.2, the RN declares the backhaul subframes as MBSFN (Multimedia Broadcast/Multicast Services over Single Frequency Network) subframes towards the UEs. This has the purpose of not confusing the attached UEs. Accordingly, there are restrictions concerning the selection of the backhaul subframes. However, as explained in 3GPP TS 36.211, Section 6.7, the RN still provides control information, such as the Physical Downlink Control Channel (PDCCH), the Physical Control Format Indicator Channel (PCFICH), the Physical Hybrid Automatic Repeat Request (HARQ) Indicator Channel (PHICH), and reference symbols in the control region of the subframe, which in MBSFN subframes consists of the first or first and second Orthogonal Frequency Division Multiplexing (OFDM) symbols, see 3GPP TS 36.211, Section 6.7. The PCFICH dynamically provides information about the actual control region size. The remaining OFDM symbols in the MBSFN subframe make up the MBSFN region. In regular subframes, the OFDM symbols not belonging to the control region are referred to as data region.

Since the RN transmits during the control region of the MBSFN subframe, and may therefore not be able to receive control signaling from its donor eNB, a new control channel, i.e., the R-PDCCH was introduced in LTE Release 10 (see 3GPP TS 36.216, Section 5.6.1). This allows the donor eNB to transmit control information in the data region of a subframe to the RN.

In 3GPP LTE, Multimedia Broadcast/Multicast Services (MBMS) are provided for efficient delivery of multicast data or broadcast data. Multicast data are data intended for reception by multiple UEs, and broadcast data can be considered as a specific case of multicast data which are intended for all UEs capable of receiving the multicast data. In the context of MBMS, broadcast data may be received by all connected UEs supporting MBMS, whereas reception of multicast data may be limited to a subgroup of the connected UEs by authentication.

A MBSFN coordinates the transmission of MBMS data, i.e., broadcast data or multicast data, among a group of eNBs such that all involved eNBs jointly transmit the data, i.e., transmit the same data in a synchronized manner using the same time and frequency resources. From a UE perspective all signals combine over the air resulting in an improved signal to interference and noise ratio (SINR). MBMS transmission in MBSFN mode is carried on the Physical Multicast Channel (PMCH) and performed in the MBSFN region of the MBSFN subframe. In LTE Releases 9 and 10, the non-MBSFN region, also referred to as the control region, which consists of the first or first and second OFDM symbols, is used by the eNB to provide cell-specific control information. The size of the control region is semi-statically configured by the Multi-cell/Multicast Coordination Entity (MCE) for all cells participating in an MBSFN area and signaled via PCFICH.

For the PMCH, a constant modulation and coding scheme (MCS) has to be set in all cells of the same MBSFN area. Within an MBSFN area, there is no interference between MBMS transmissions of different cells. This allows to set an MCS with lower robustness than used for unicast at cell borders. MCS with lower robustness may achieve higher data rates and are suitable if the coverage is good throughout the MBSFN area (signal to noise ratio (SNR) above the minimum required for the chosen MCS). If the PMCH MCS robustness is set rather low, more "coverage holes" exist for the PMCH transmission than for unicast transmissions. It would therefore be desirable to improve coverage for MBMS transmission in MBSFN mode, e.g., using relaying. However, according to 3GPP TS 36.300, Section 15.1, RNs do not support MBMS.

Accordingly, there is a need for efficient techniques which allow for efficient delivery of multicast data and broadcast data also when using relaying.

SUMMARY

According to an embodiment of the invention, a method of relaying multicast data in a wireless network is provided. The wireless network comprises at least one RN. The RN is configured for transmissions on the basis of a radio frame comprising one or more subframes for unicast transmission and one or more subframes for multicast transmission. According to the method, the RN receives multicast data from a base station. The multicast data are received by the RN in one or more subframes which are selectable from the one or more subframes for unicast transmission and the one or more subframes for multicast transmission. Further, the RN transmits the received multicast data in one or more of the subframes for multicast transmission.

According to a further embodiment of the invention, a method of relaying multicast data in a wireless network is provided. The wireless network comprises at least one RN. The RN is configured for transmissions on the basis of a radio frame comprising one or more subframes for unicast transmission and one or more subframes for multicast transmission. According the method, a base station transmits multicast data to the RN. The base station transmits the multicast data in one or more subframes which are selectable from the one or more subframes for unicast transmission and the one or more subframes for multicast transmission.

According to a further embodiment of the invention, a RN for a wireless network is provided. The wireless network comprises at least one RN. The RN is configured for transmissions on the basis of a radio frame comprising one or more subframes for unicast transmission and one or more subframes for multicast transmission. The RN comprises at least one radio interface for communication with a base station and one or more mobile terminals and a processor for controlling operations of the relay node. These operations as controlled by the processor comprise:

receiving, via the at least one radio interface, multicast data from the base station in one or more subframes which are selectable from the one or more subframes for unicast transmission and the one or more subframes for multicast transmission, and transmitting, via the at least one radio interface, the received multicast data in one or more of the subframes for multicast transmission.

According to a further embodiment of the invention, a base station for a wireless network is provided. The wireless network comprises at least one RN. The RN is configured for transmissions on the basis of a radio frame comprising one or more subframes for unicast transmission and one or more subframes for multicast transmission. The base station comprises at least one radio interface for communication with one or more mobile terminals and the at least one RN and a processor for controlling operations of the base station. These operations as controlled by the processor comprise:

the base station transmitting, via the at least one radio interface, multicast data to the at least one RN in one or more subframes which are selectable from the one or more subframes for unicast transmission and the one or more subframes for multicast transmission.

According to a further embodiment of the invention, a wireless network system is provided. The system comprises a base station and a relay node RN. The RN is configured for transmissions on the basis of a radio frame comprising one or more subframes for unicast transmission and one or more subframes for multicast transmission. The base station is configured to transmit multicast data to the RN in one or more subframes which are selectable from the one or more subframes for unicast transmission and the one or more subframes for multicast transmission. The RN is configured to receive the multicast data as transmitted by the base station and transmit the received multicast data in one or more of the subframes for multicast transmission.

According to further embodiments, other methods, devices, or computer program products for implementing the methods may be provided.

BRIEF DESCRIPTION OF THE DRAWINGS

FIG. 8 illustrates an information element as used in an embodiment of the invention for signaling a radio frame configuration of a RN.

FIG. 9 illustrates a further information element as used in an embodiment of the invention for signaling restrictions of a RN regarding control signaling.

FIG. 10 illustrates a further information element as used in an embodiment of the invention for signaling restrictions of a RN regarding control signaling.

DETAILED DESCRIPTION OF EMBODIMENTS

In the following, the invention will be explained in more detail by referring to exemplary embodiments and to the accompanying drawings. The illustrated embodiments relate to concepts of multicast data. The concepts may be applied in a wireless network according to 3GPP LTE. However, it is to be understood that the illustrated concepts may be applied in other types of wireless networks as well.

Figure 1:
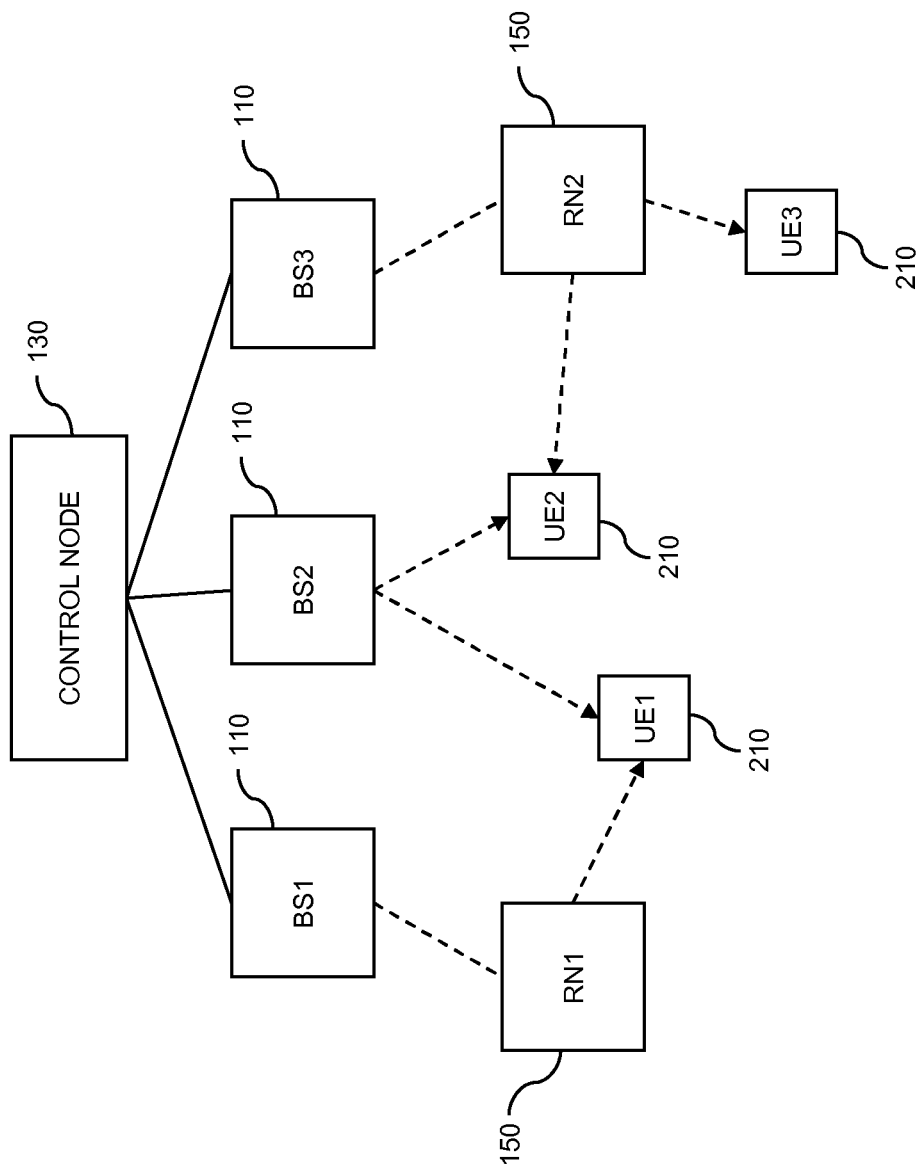
FIG. 1 schematically illustrates a wireless network in which concepts according to embodiments of the invention may be implemented.

FIG. 1 schematically illustrates an exemplary wireless network in which concepts according to embodiments of the invention can be applied.

As illustrated, the wireless network includes a number of base stations 110, in particular a first base station (BS1), a second base station (BS2), and a third base station (BS3). Further, the wireless network includes a number of RNs 150, in particular a first RN (RN1), and a second relay node (RN2). In addition, the wireless network includes a control node 130, which has the purpose of coordinating multicast transmissions in the wireless network, which may also include supplying multicast data to the base stations 110. This may be accomplished using wire-based links, illustrated by solid lines. The base stations 110 may in turn forward the multicast data to their subordinate RNs 150.

This is in turn accomplished using radio links, illustrated by dashed lines. In the illustrated example, BS1 forwards the multicast data to RN1, i.e., may be regarded as a donor base station of RN1. BS3 forwards the multicast data to RN2, i.e., may be regarded as a donor base station of RN2.

A number of mobile terminals or other types of UEs 210, in particular a first UE (UE1), a second UE (UE2), and a third UE (UE3), are located in a coverage area of the wireless network which allows for receiving the multicast data. This is accomplished using radio links, as illustrated by dashed arrows. In the illustrated example, UE1 receives the multicast data in a joint transmission from RN1 and BS2, UE2 receives the multicast data in a joint transmission from BS2 and RN2, and UE3 receives the multicast data in a transmission from RN2. Here, the term "joint transmission" means that the multicast data are transmitted in a synchronized manner using the same time and frequency resources such that the transmitted signals constructively combine over the air. The term "multicast data" means data intended for reception by multiple UEs and also includes broadcast data. The term "broadcast data" means a specific case of multicast data which are intended for all UEs capable of receiving the multicast data.

Figure 2:
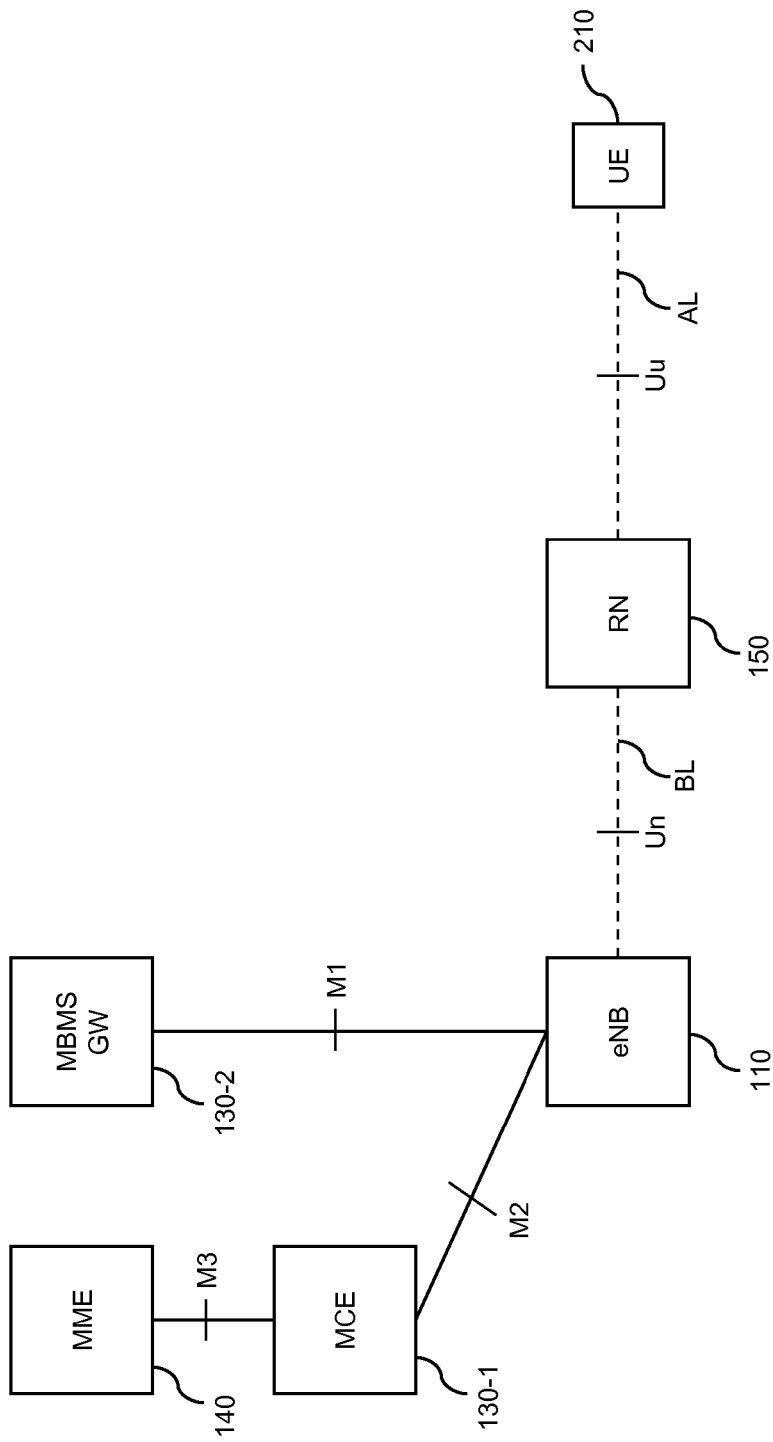
FIG. 2 further illustrates structures in a wireless network according to an embodiment of the invention.

The wireless network of FIG. 1 may be implemented according to 3GPP LTE. In this case, the transmission of the multicast data may be accomplished using MBMS signals in MBSFN transmission mode. Broadcast data may then be received by all UEs supporting MBMS, whereas reception of multicast data may be limited to a subgroup of the UEs, e.g., by authentication. Structures of the wireless network in such an LTE implementation are further illustrated in FIG. 2. For the sake of clarity, FIG. 2 illustrates only a single base station 110, termed as eNB in accordance with the 3GPP LTE terminology, a single RN 150, and a single UE 210. However, it is to be understood that multiple base stations, multiple RNs, and/or multiple UEs may be present.

As illustrated in FIG. 2, the control node 130 of FIG. 1 is implemented multiple entities, namely an MCE 130-1, and an MBMS gateway (MBMS GW) 130-2. In addition, FIG. 2 also illustrates a Mobility Management Entity (MME) 140.

Functionalities of the MCE 130-1 include admission control and allocation of radio resources to be used by eNBs and RNs, e.g., the eNB 110 and the RN 150, in an MBSFN area for joint transmission of MBMS signals in MBSFN transmission mode. The MCE 130-1 may also decide on a MCS to be used for the joint transmission. Functionalities of the MBMS GW 130-2 include providing the multicast data to eNBs, e.g., to the eNB 110. As illustrated, the MCE 130-1 may be coupled to the MME 140 via an interface termed as "M3", the MCE 130-1 may be coupled to the eNB 110 via an interface termed as "M2", and the MBMS GW 130-2 may be coupled to the eNB 110 via an interface termed as "M1". Additional functionalities of the MCE 130-1 and the MBMS GW 130-2 and properties of the interfaces M1, M2, and M3 may be as defined in 3GPP TS 36.300. As further illustrated, the eNB 110 is coupled to the RN 150 via a backhaul link BL which may be established via an LTE radio interface termed as "Un", and the RN 150 is coupled to the UE 210 via an access link which may be established via an LTE radio interface termed as "Uu". Further details concerning the Un interface and the Uu interface can be found in the 3GPP TSs.

Figure 3:
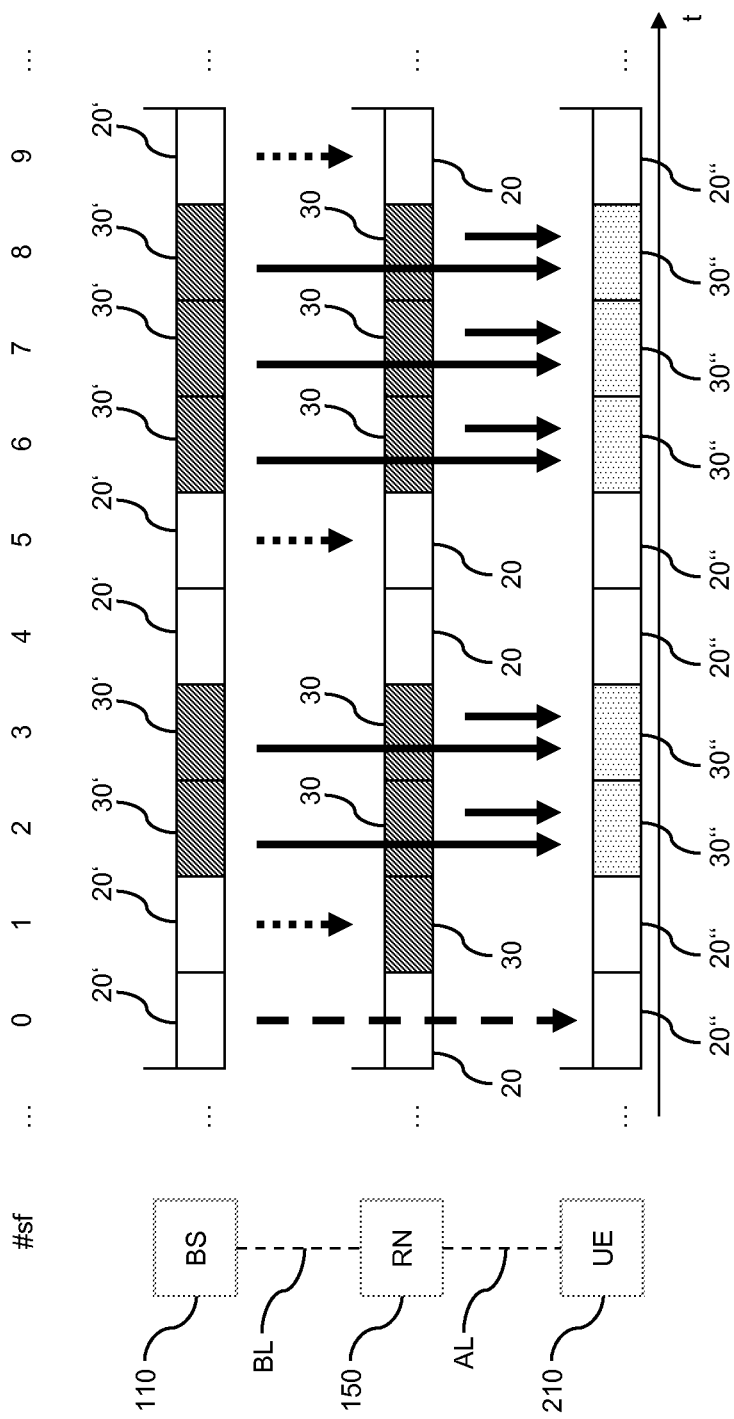
FIG. 3 schematically illustrates transmissions in a wireless network in an operating mode of a RN according to an embodiment of the invention.

FIG. 3 schematically illustrates transmissions in a wireless network when using an operating mode of a RN according to an embodiment of the invention, e.g., a RN as illustrated in FIGS. 1 and 2. FIG. 3 also depicts the RN 150, the donor base station (BS) 110 of the RN 150, and a UE 210. Further, the backhaul link BL between the donor base station 110 and the RN 150 as well as the access link between the RN 150 and the UE 210 are depicted. The access link is used for multicast transmissions to the UE 210 and other UEs. In some embodiments, it may also be used for DL unicast transmissions from the RN 150 to the UE 210 or for UL unicast transmissions from the UE 210 to the RN 150. Next to the RN 150 a radio frame configuration for transmissions by the RN is illustrated. Next to the donor base station 110 a radio frame configuration for transmissions by the donor base station 110 is illustrated. Next to the UE 210, a radio frame configuration used for reception by the UE 210 is illustrated. As shown, the radio frame configurations each comprise a number of subframes 20, 30, 20', 30', 20", 30". The row denoted by #sf indicates an index of the subframes.

In the radio frame configuration of the base station and in the radio frame configuration of the RN, shading indicates subframes 30, 30' for multicast transmission. In the above-mentioned 3GPP LTE scenario, these subframes may be MBSFN subframes. Absence of shading indicates regular subframes, i.e., subframes for unicast transmission. In the radio frame configuration of the UE, shading indicates subframes 30" in which the UE is configured for reception of multicast transmissions, e.g., multicast transmission of MBMS signals in MBSFN transmission mode.

In FIG. 3, transmissions are illustrated by vertical arrows. Solid arrows illustrate multicast transmissions, i.e., transmissions to a plurality of recipients. The multicast transmissions may be accomplished jointly from the base station 110 to the UE 210 and from the RN 150 to the UE 210. Dotted arrows illustrate unicast transmissions, i.e., transmissions to a single recipient, from the base station 110 to the RN 150. A dashed arrow illustrates a unicast transmission from the base station 110 to the UE 210. The unicast transmissions from the donor base station 110 to the RN 150 have the purpose of providing multicast data for the multicast transmissions to the RN 150. Further, these unicast transmissions may also include related control information, e.g., for synchronizing the multicast transmissions. As can be seen, the donor base station and the RN 150 jointly transmit the multicast transmissions to the UE 210. Further, the subframes in the radio frame configuration of the RN 150, which are used by the RN 150 to receive the unicast transmissions from the donor base station 110, i.e., the backhaul subframes, can be selected to correspond to a subframe for multicast transmission, as exemplified by the subframe with index 1, but can also be selected to correspond to a subframe for unicast transmission, as exemplified by the subframe with index 5. Accordingly, the selection of the backhaul subframes is not restricted. It is therefore possible to use subframes for unicast transmission for receiving the multicast data in the RN 150. This is beneficial when considering that there may be only a limited number of subframes which can be configured for multicast transmission. For example, in 3GPP LTE at most six out of ten subframes of a radio frame can be configured as MBSFN subframes. Moreover, there are no unicast transmissions from the RN 150 to the UE 210, i.e., the operation as illustrated in FIG. 3 corresponds to an operating mode in which the RN 150 relays multicast data, but no unicast data. The latter avoids confusion of the UE 210 due to the unicast transmissions from the donor base station to the RN 150. In particular, the RN 150 can be implemented to appear transparent to the UE 210, because the UE 210 receives unicast transmissions only from the base station, and the joint multicast transmissions combine over the air so that their origin is not separable by the UE. There is no need for the RN 150 to declare the backhaul subframes as subframes for multicast transmission, thereby increasing the number of subframes for multicast transmission which are actually available for multicast transmissions. For example, in exemplary radio frame configurations of FIG. 3, the subframe with index 1 would not be available for multicast transmissions.

Accordingly, an embodiment of the present invention is based on providing a RN with an operating mode in which the relay node relays multicast data, but no unicast data. This operating mode is herein also referred to as a multicast-only operating mode. In the above-mentioned 3GPP LTE scenario, the RN may forward MBMS data only. In this case the multicast-only operating mode may also be termed as MBMS only operating mode. Since this kind of relay operation does not forward unicast data, the RN does not need to create its own relay cell, and the RN does not have to configure subframes, in which the eNB may transmit the backhaul traffic to the RN, as MBSFN subframes. Hence, the donor eNB is free to use any subframe for backhauling and it can use the regular PDCCH/PDSCH structure instead of the R-PDCCH for backhauling. Such a 3GPP LTE RN with MBMS-only operating mode can use all of the available MBSFN subframes for joint MBMS transmission within an MBSFN area.

Towards UEs, the RN with MBMS-only operating mode is invisible in regular subframes. In MBSFN subframes it would jointly transmit MBMS data. However, during joint MBSFN transmissions such a RN would be transparent since all MBMS signals transmitted in the MBSFN combine over the air and are not separable. Regarding the uplink (UL), a RN in MBMS-only operating mode does not have to be capable of receiving uplink signals from UEs.

In some embodiments, if less MBSFN subframes are needed for the transmission of MBMS data, while unicast traffic increases in the coverage area of the RN, the RN may dynamically switch to a mixed operating mode in which the RN it creates its own cell to serve UEs, i.e., also forwards unicast data, while MBSFN transmission of MBMS signals is still supported. If the MBMS traffic load requires the use of all or at least a majority of the MBSFN subframes, the RN may switch back to the MBMS-only operating mode. Transmissions in such an additional operating mode of the RN according to an embodiment of the invention are further illustrated in FIG. 4. As mentioned above, this additional operating mode is herein referred to as a mixed operating mode.

Figure 4:
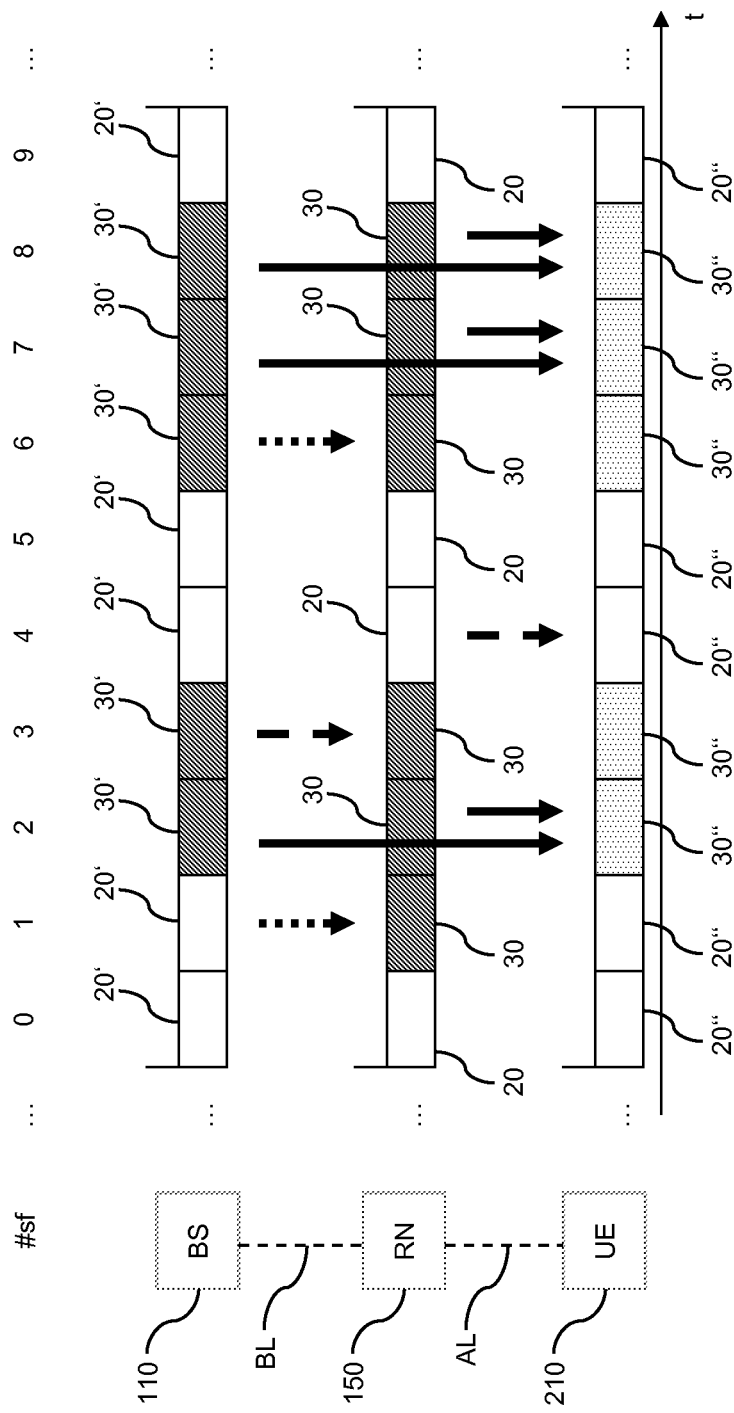
FIG. 4 schematically illustrates transmissions in a wireless network in an additional operating mode of a RN according to an embodiment of the invention.

As can be seen from FIG. 4, which is generally similar to FIG. 3, in the mixed operating mode the RN 150 forwards both multicast data and unicast data. As in FIG. 3, the reception of the multicast data to be forwarded in the RN 150 occurs via unicast transmissions from the donor base station, illustrated by dotted arrows. However, as exemplified in the subframes with index 1 and 6, these unicast transmissions are accomplished in backhaul subframes corresponding to subframes for multicast transmissions 30 in the radio frame configuration of the RN 150. As further illustrated in FIG. 4 also the reception of unicast data to be forwarded in the RN 150 occurs via unicast transmissions from the donor base station 110, illustrated by a dashed arrow. Again, these unicast transmissions are accomplished in backhaul subframes corresponding to subframes for multicast transmission 30 in the radio frame configuration of the RN 150, like exemplified in the subframe with index 3. The transmission of the unicast data from the RN 150 to the UE 210, again illustrated by a dashed arrow, is accomplished in subframes for unicast transmission, like exemplified in the subframe with index 4. As mentioned above, in the 3GPP LTE scenario the backhaul subframes may be MBSFN subframes. This behavior is compatible with the requirements of 3GPP TS 36.216, so that the RN is capable of building a relay cell for serving UEs in unicast transmissions. At the same time, the RN can also support MBSFN transmission of MBMS signals. As can be seen from the illustration of FIG. 4, in the mixed operating mode less of the subframes for multicast transmission are available for multicast transmissions towards the UEs since some of these subframes are needed as backhaul subframes for receiving data from the donor base station.

According to an embodiment of the invention, the RN may support the multicast-only operating mode, but not the mixed operating mode. Alternatively, the RN may support both the multicast-only and the mixed operating mode. As mentioned above, in the multicast-only operating mode the RN may be transparent to the UEs, such that it does not have to create its own relay cell, which makes it less restrictive regarding the backhaul link to the donor base station. In the mixed operating mode, the RN may create its own relay cell to serve UEs, but may still participate in joint multicast transmissions of multicast data.

The RN supporting both the multicast-only and the mixed operating mode could be statically configured, e.g., by operations and maintenance procedures, when to operate in the multicast-only operating mode and when to operate in the mixed operating mode. Further, the RN could also dynamically switch between the multicast-only operating mode and the mixed operating mode, e.g., depending on the amount radio resources needed for multicast transmissions and/or for unicast transmissions to UEs in the coverage area of the RN.

In the mixed operating mode, only a subset of the subframes would be configured as subframes for multicast transmission. However, a larger amount of radio resources may be needed for multicast transmissions. This may trigger the RN to switch from the mixed operating mode to the multicast-only operating mode. When switching from the mixed operating mode to the multicast-only operating mode, also a handover of UEs involved in transmission of unicast data and served by the RN may be initiated. The handover may for example be to the donor base station, to some other base station, or to some other RN.

For example, when assuming the structure according to 3GPP LTE as illustrated in FIG. 2, the MCE 130-1 may request the allocation of a larger amount of radio resources to multicast transmissions, such that most MBSFN subframes would be needed for MBSFN transmission of MBMS data, while the number of MBSFN subframes remaining to be used as backhaul subframes would not be sufficient to support both MBMS and unicast transmission. Active UEs that are involved in unicast transmission and served by the RN would be in connected mode. The RN could then initiate a forced handover of these UEs to another suitable cell, e.g., served by the donor eNB, by another eNB, or by another RN. UEs in idle mode may be moved to another cell. This could be achieved by paging these UEs, thereby moving them to connected mode such that a forced handover can be initiated. A further possibility to avoid that UEs in idle mode camp on the RN cell would be to set a very low priority to that cell. The RN may then stop transmitting in the regular subframes and providing reference signals that UEs use for measurements, thereby deactivating the relay cell of the RN. The RN may further informs the donor eNB that it has switched to the MBMS-only operating mode, such that it can receive backhaul data in basically any subframe that is not used for MBSFN transmission and that the use of the R-PDCCH is not needed any more.

If in the multicast-only operating mode a larger amount of radio resources is needed for unicast transmissions or the amount of radio resources needed for multicast transmissions is below a threshold, this may trigger the RN to switch from the multicast-only operating mode to the mixed operating mode, thereby making additional radio resources available for unicast transmissions and/or improving coverage for unicast transmissions.

For example, when assuming the structure according to 3GPP LTE as illustrated in FIG. 2, if the MCE 130-1 releases radio resources allocating less MBSFN subframes for MBMS transmission, such that the number of MBSFN subframes would be sufficient to carry backhaul data for both unicast and MBMS transmission, a RN may decide to switch from the MBMS-only operating mode to the mixed operating mode. More optimized solutions could also be applied, e.g., unicast activity in the coverage area of the RN could be monitored using either measurements or information from the donor eNB. When the RN switches from the MBMS-only operating mode to the mixed operating mode, it may have to inform the donor eNB that it has switched to the mixed operating mode so that this can be taken into account by the eNB, e.g., by selecting the backhaul subframes as explained in connection with FIG. 4. Then, the RN may start transmitting data in regular subframes and transmitting reference signals and system or control information to create its own cell and serve UEs.

Figure 5:
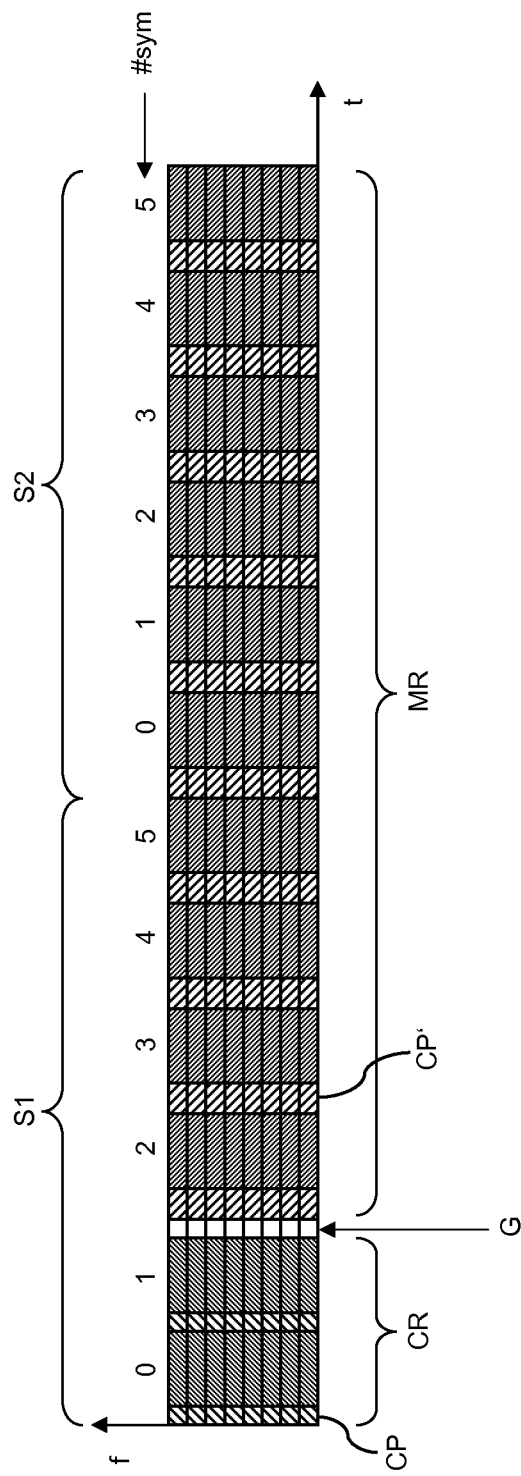
FIG. 5 schematically illustrates a subframe for multicast transmission as used in an embodiment of the invention.

FIG. 5 schematically illustrates a subframe for multicast transmission as used in an embodiment of the invention. In particular, the illustrated structure of the subframe corresponds to a MBSFN subframe as used in the above-mentioned 3GPP LTE scenario. The illustration shows the time and frequency resources of the subframe in form of blocks arranged along a time axis, denoted by t, and a frequency axis, denoted by f.

As illustrated, the subframe for multicast transmission includes a first slot S1 and a second slot S2, each consisting of six OFDM symbols. In FIG. 5, a symbol index is denoted by #sym. In the illustrated example, the first two OFDM symbols of the subframe, i.e., the OFDM symbols with index 0 and 1 in the first slot S1, form a control region CR of the subframe. The remaining OFDM symbols of the subframe, i.e., the OFDM symbols with index 2 to 5 in the first slot S1 and the OFDM symbols with index 0 to 5 in the second slot S2, form a multicast region of the subframe, in the illustrated example of an MBSFN subframe also referred to as MBSFN region.

Each OFDM symbol of the subframe includes a cyclic prefix CP, CP'. For the OFDM symbols of the multicast region MR, typically a length of the cyclic prefix CP' is used which is extended as compared to the length of the cyclic prefix for the OFDM symbols of the control region. With the extended cyclic prefix CP', it can be taken into account that the UE typically receives the joint MBSFN transmission in the multicast region from various sources, which may have different distances to the UE. According to 3GPP TS36.211 Table 6.12-1, the cyclic prefix CP of the first OFDM symbol of the control region CR, i.e., the OFDM symbol with index 0 in the first slot S1, has a length of about $T_{CP0}$=5.2 μs, the cyclic prefix CP of the second OFDM symbol of the control region CR, i.e., the OFDM symbol with index 1 in the first slot S1, has a length of about $T_{CP0}$=4.7 μs, and the cyclic prefixes CP' of the OFDM symbols in the multicast region MR each have an extended length of about $T_{CP-e}$=16.7 μs.

The OFDM symbols in the subframe are arranged according to a regular grid with a basic length of 1 s/12=(T+$T_{CP-e}$), where T denotes the length of an OFDM symbol and is about T=66.7 μs. All OFDM symbols within the MBSFN region are transmitted according to this grid, whereas the OFDM symbols within the control region CR use the shorter cyclic prefix CP and are thus shorter than two OFDM symbols using the extended cyclic prefix CP' of the multicast region. Thus, there is a gap G between the last OFDM symbol of the control region CR and the first OFDM symbol of the multicast region. The length of the gap G depends on whether one or two OFDM symbols are configured for the control region CR. In the example of FIG. 2, in which the control region of the subframe includes two OFDM symbols, the length of the gap G may be about 13.5 μs.

When the RN uses the above-mentioned MBMS-only operating mode, the control region CR may carry DL control signaling from the donor eNB, which can be received by the RN and also by UEs, whereas the multicast region MR may carry the actual MBSFN transmission by the RN, and typically also by the donor eNB. However, it is to be understood that the control region CR may also be used to convey other types of control information.

In some embodiments, if the RN using the MBMS-only operating mode participates in the MBMS transmission, it will transmit the PMCH in the multicast region, i.e., operate in a transmit (Tx) mode. Before and afterwards the RN will monitor control information, e.g., uplink grants or downlink assignments, provided by the donor eNB, i.e., operate in a receive (Rx) mode. The Rx-Tx switching is performed between the control region CR and the multicast region MR, and a Tx-Rx switching is performed between the multicast region and the control region CR of the subsequent subframe. In the example of FIG. 5, Tx-Rx switching would therefore occur before the first OFDM symbol of the subsequent subframe and after the last OFDM symbol of the subframe for multicast transmission, and Rx-Tx switching would occur between the last OFDM symbol of the control region and the first OFDM symbol of the multicast region MR, i.e., between the OFDM symbol with index 1 and the OFDM symbol with index 2, which is at the location of the gap G. The gap G may therefore be used for the Rx-Tx switching. If the Rx-Tx switching cannot be done during the gap G switching time could alternatively be taken from the multicast region MR, from the control region CR or from both. Similarly, if the Tx-Rx switching cannot be done between the last OFDM symbol of the multicast region MR and the first OFDM symbol of the control region of the subsequent subframe, e.g., during some gap formed at this position, switching time could be taken from the multicast region MR, from the control region CR of the subsequent subframe, or from both.

In the above examples, if the switching time is taken from the control region CR, this may result in the RN not being able to completely receive a OFDM symbol of the control region CR, which may result in high error probability. If the switching time is taken from the multicast region MR, this may result in the RN not being able to start the multicast transmission in time or being forced to end the multicast transmission early. In other words, if the switching time is taken from the multicast region MR, the RN may need to start its participation in a joint multicast transmission a bit later and/or to end its participation in a joint multicast transmission a bit earlier. If the switching time is taken from both the control region CR and the multicast region MR, both of the above effects may occur.

The effect of the switching time depends on various factors, e.g., on the length of the control region CR, but also where the multicast region MR starts. If for example the control region CR has a length of one OFDM symbol and the multicast region MR starts at the third OFDM symbol, at least one entire symbol can be used for Rx-Tx switching.

Due to the above-mentioned Rx-Tx switching and Tx-Rx switching, the donor eNB may have some restrictions concerning the use of the control region CR for the transmission of control information to the RN. Accordingly, some embodiments of the invention include that the RN provides an indication of such restrictions to the eNB. This will be further explained in the following.

Figure 6:
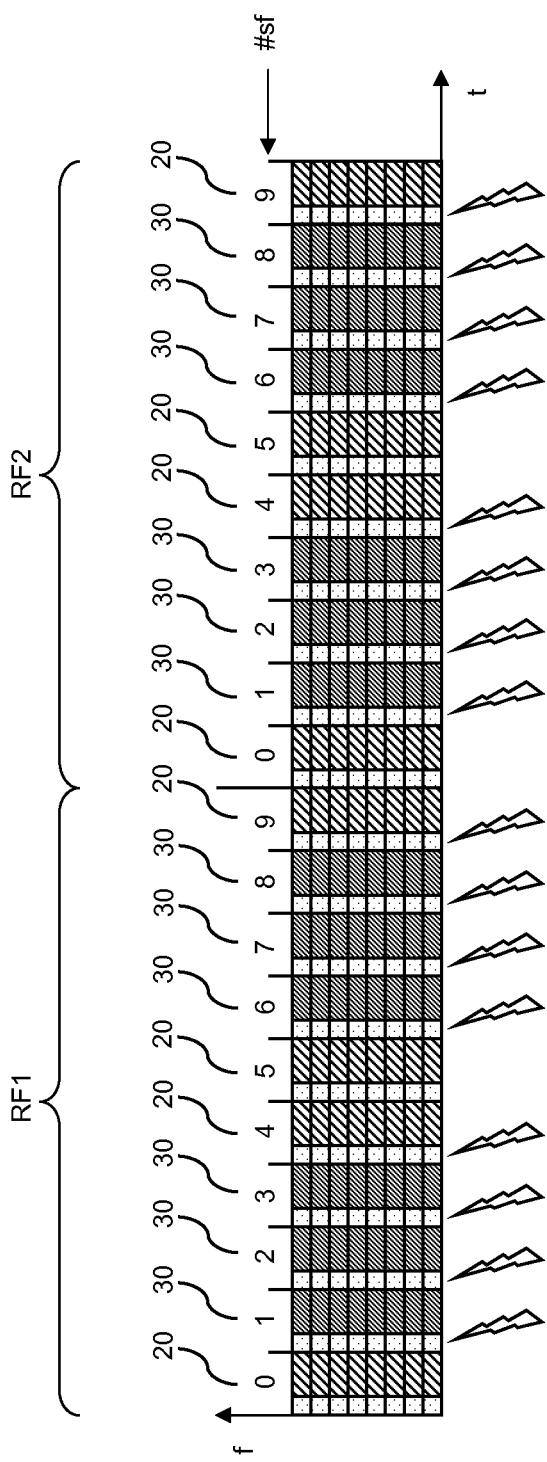
FIG. 6 schematically illustrates an exemplary configuration of radio frames according to an embodiment of the invention.

FIG. 6 schematically illustrates an exemplary configuration of radio frames as used by a RN according to an embodiment of the invention. More specifically, FIG. 6 illustrates an exemplary sequence of a first radio frame RF1 and a subsequent second radio frame RF2. Similar as in FIG. 5, the illustration shows time and frequency resources in the form of blocks arranged along a time axis, denoted by t, and a frequency axis, denoted by f. Along the time axis, the radio frames RF1, RF2 are subdivided into a sequence of subframes 20, 30. An index of the subframes is denoted by #sf. The subframes 20 correspond to subframes configured for unicast transmission, and the subframes 30 correspond to subframes configured for multicast transmission. The subframes 30 may each have a structure as illustrated in FIG. 5. As further illustrated, each of the subframes includes a control region, indicated by dotted shading, and a multicast region, indicated by hatched shading. Positions at which there may be restrictions concerning the transmission of control information to the RN using the control region of a subframe for multicast transmission are marked by flash symbols. In the 3GPP LTE scenario, the radio frame configurations of FIG. 6 correspond to a maximum configurable number of MBSFN subframes when assuming transmissions using frequency division duplexing (FDD) between DL and UL.

Figure 7:
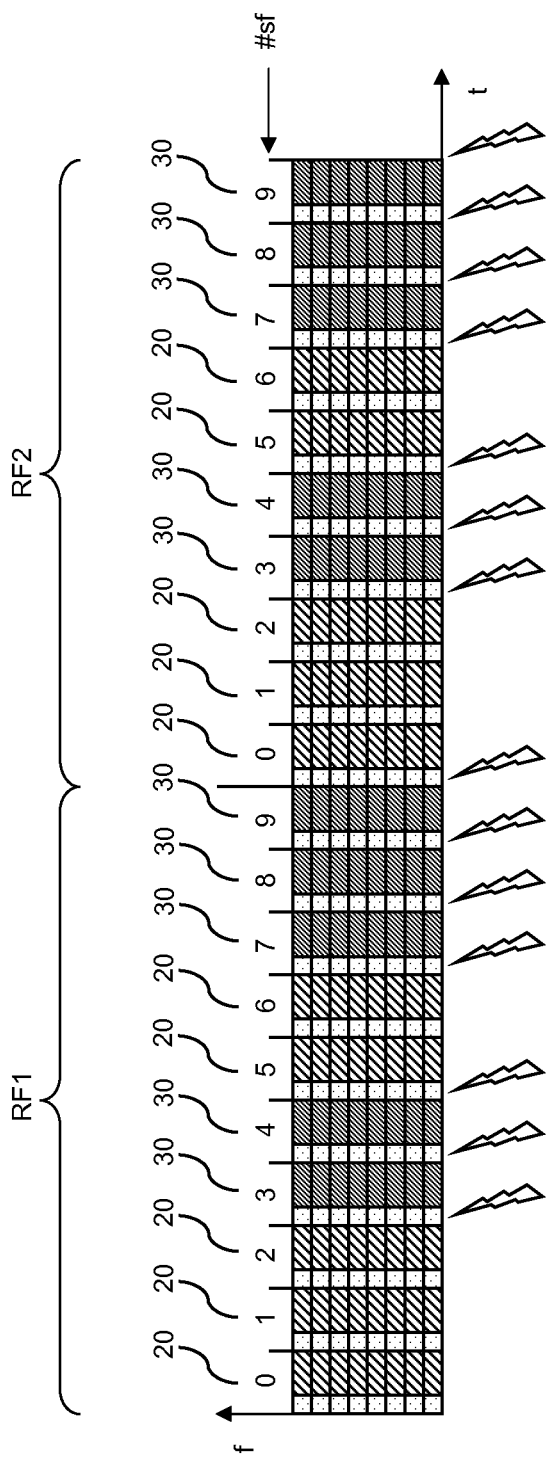
FIG. 7 schematically illustrates a further exemplary configuration of radio frames according to an embodiment of the invention.

FIG. 7 shows a further exemplary configuration of radio frames as used by a RN according to an embodiment of the invention. The illustration of FIG. 7 is generally similar to that of FIG. 6. However, in the 3GPP LTE scenario, the radio frame configurations of FIG. 7 correspond to a maximum configurable number of MBSFN subframes when assuming transmissions using time division duplexing (TDD) between DL and UL. As can be seen, this results in less of the subframes 20, 30 being configurable for multicast transmissions.

As can be seen from the examples of FIGS. 6 and 7, at most eight subframes for FDD and seven subframes for TDD will have restrictions concerning the transmission of control information. In FIG. 6, the RN using the multicast-only operating mode has no restrictions at least in subframes with index 0 and 5, and in FIG. 7 the RN using the multicast-only operating mode has no restrictions at least in subframes with index 1, 2, and 6.

To let the donor base station know the restrictions concerning the transmission of control information to the RN using control region of the subframes for multicast transmission configured in the RN operating in the multicast-only mode, the RN may provide an indication to the donor base station. For example, such an indication could include the positions of subframes marked by flash symbols in FIG. 6 or 7. The donor base station could then apply suitable mechanisms to take into account the restrictions.

For example, the donor base station could choose not to transmit any control information in the indicated subframes.

In the 3GPP LTE scenario, the donor base station could refrain from transmitting the PDCCH for the RN. This may be beneficial if the switching time is so long that the error probability is very high and the PDCCH will not be detectable or decodable.

The donor base station could also adapt the way of transmitting the control information in the indicated subframes.

For example, the donor base station could also issue control information which is valid for more than one subframe, thereby avoiding transmission of control information in at least some of the indicated subframes, e.g., by using semi-persistent scheduling to issue a semi-persistent DL assignment which is valid for more than one subframe. When using semi-persistent scheduling in the 3GPP LTE scenario, the donor eNB can transmit data on the PDSCH of subframes which do not contain the PDCCH. Even the use of dynamic inter-subframe scheduling may be considered. Since the traffic load for the delivery of data for multicast transmissions, e.g., for MBSFN transmissions, can be rather static, semi-persistent scheduling may be an appropriate choice.

If in the 3GPP LTE scenario the donor eNB and the RN support carrier aggregation, the eNB could also use cross-carrier scheduling if multiple carriers are available. In this case the donor eNB could transmit the PDCCHs intended for the MBSFN subframe and its subsequent subframe on a different component carrier. If the component carriers are sufficiently isolated, e.g., by large separation in the frequency domain, the Rx-Tx and Tx-Rx switching on one carrier does not affect the transmission and reception on another carrier.

In the 3GPP LTE scenario, the donor eNB could choose a higher PDCCH aggregation level for the RN, e.g., by lowering the code rate, which in turn increases the robustness of the PDCCH transmission. This may be beneficial if the switching time takes away only a small fraction of the PDCCH region and the resulting error probability is acceptable.

In the 3GPP LTE scenario, the donor eNB could also choose to transmit the PDCCH on a position where most parts of the PDCCH, i.e., most Resource Element Groups (REGs), are located in a OFDM symbol which can be received completely by the RN. In the MBSFN subframe, most REGs can expected to be located in the beginning of the control region and in the subframe following the MBSFN subframe they can expected to be at the end of the control region.

In the 3GPP LTE scenario, the donor eNB could also use the R-PDCCH to transmit the control information. Since the R-PDCCH is not located in the normal PDCCH control region, but it is transmitted in the data region of a subframe, the donor eNB can send control information to the RN with MBMS-only operating mode at least in subframes that are not used for MBMS transmission, e.g., the subframes following the MBSFN subframes.

In the 3GPP LTE scenario, other physical channels that might be affected are the PHICH and the PCFICH, which are transmitted in the very first DL symbol of any subframe. If the donor eNB is aware of the restrictions of a RN using the MBMS-only operating mode it could also avoid sending feedback via the PHICH and instead send an UL grant with a non-toggled New Data Indicator (NDI) bit (indicating a negative acknowledgement), it could send an UL grant with a toggled NDI bit (indicating an acknowledgement) or it could send nothing (indicating an acknowledgement). The donor eNB could also avoid modifying the size of the control region compared to the previous MBSFN subframe. Such modifications may be signaled via the PCFICH. Then the RN using the MBMS-only operating mode would apply the same size of the control region as in the MBSFN subframe before. If possible, the donor eNB might also use higher layer signaling to modify the size of the control region in the MBSFN subframes.

If in the 3GPP LTE scenario switching time is taken from the MBSFN region, this may result in the RN using the MBMS-only operating mode joining the MBSFN transmission a bit later and/or stopping it stop a bit earlier. Here, the Rx-Tx switching is typically less critical since, as explained in connection with FIG. 5, there is a gap between the control region and the MBSFN region. However, the first OFDM symbol of the MBSFN region carrying the PMCH might be used for reference signals. Since the transmission of reference signals may be critical, it should be avoided to take the switching time from this OFDM symbol.

Further, in the 3GPP scenario the donor eNB may be able to configure the control region at the beginning of the MBSFN subframe to a certain degree, e.g., using the PCFICH, such that the donor eNB and the RN using the MBMS-only operating mode use different control region sizes. If the non-MBSFN region as configured for the eNB by the MCE consists of two OFDM symbols, the donor eNB could configure the RN to use a single-symbol control region in order to increase the gap between the control and the MBSFN region. Thus, an entire OFDM symbol could be used for Rx-Tx switching.

In the following, ways of how the donor base station may become aware of the restrictions concerning the transmission of control information to the RN operating in the multicast-only mode will be discussed in more detail.

In some cases, the donor base station may already have information from which the presence of such restrictions can be derived. For example, if in the 3GPP LTE scenario the donor eNB is part of the same MBSFN area as the RN, it will know the MBSFN subframes actually used for MBSM transmission using the MBMS Scheduling Information received from the MCE 130-1 via the M2 interface and from the timestamps in the MBMS data packets received from the MBMS GW 130-2 via the M1 interface. Then it can derive in which subframes the RN may have restrictions concerning the transmission of control information, e.g., in MBSFN subframes that are actually used for MBMS transmission and subframes that follow the MBMS transmission.

In these cases, it may be sufficient for the donor base station to receive an indication from the RN that it uses the multicast-only mode. For example, this indication be signaled by an indicator bit in a signaling message from the RN to the donor base station.

In other cases the donor base station may not have information available from which the presence of such restrictions can be derived. For example, in the 3GPP LTE scenario the donor eNB may be not aware of the MBSFN subframes actually used for MBSFN transmission at the RN because it is not part of the same MBSFN area.

In these cases, explicit signaling from the RN to the donor base station may be used to indicate either the subframes configured for multicast transmissions, the subframes to be actually used for multicast transmissions, or the subframes in which the RN has restrictions regarding the transmission of control information. If such explicit signaling is not received, donor base station may assume that all subframes which can be configured for multicast transmissions are actually to be used for multicast transmissions by the RN.

The options of indicating the subframes to be actually used for multicast transmissions, or the subframes in which the RN has restrictions regarding the transmission of control information have the benefit that the donor base station may also use this indication for deriving which of the subframes configured for multicast transmissions could be used as backhaul subframes for transmitting multicast data to the RN.

In the 3GPP LTE scenario, the subframes configured for multicast transmission, i.e., the reserved MBSFN subframes could be indicated by the RN to the eNB by reusing an information element termed as "MBSFN-SubframeConfig" and defined by 3GPP TS36.331, Section 6.3.7. Such an information element is illustrated in FIG. 8. In particular, the positions of the reserved MBSFN subframes could be indicated by the "BIT STRING" field in which each bit corresponds to a position in a radio frame, and setting the bit can be used to indicate that the subframe in the corresponding position is a reserved MBSFN subframe.

As mentioned above, the positions of subframes with restrictions concerning the signaling of control information can also be explicitly signaled from the RN to the donor base station. For example, the positions of the subframes in which the RN will perform the above-mentioned Rx-Tx switching and/or Tx-Rx switching can be indicated. In the 3GPP LTE scenario, for example the information element termed as "MBSFN-SubframeConfig" could be extended for this purpose to include a bit string of one octet per radio frame. In this bit string, each bit corresponds to a position in a radio frame, and setting the bit can be used to indicate whether the subframe in the corresponding position has restrictions concerning the transmission of control information or not.

In the 3GPP LTE scenario, when assuming high load for MBMS transmission, it is also possible to omit the fields "radioframeAllocationPeriod" and "radioframeAllocationOffset" from the information element of FIG. 6 and only indicate the subframes within the "BIT STRING" of the "oneFrame" or "fourFrame" structures as illustrated in FIG. 9, or to only use the "oneFrame" structure as illustrated in FIG. 10, each bit of the "BIT STRING" field indicating the subframes in which the RN as restrictions concerning the transmission of control information.

Figure 11:
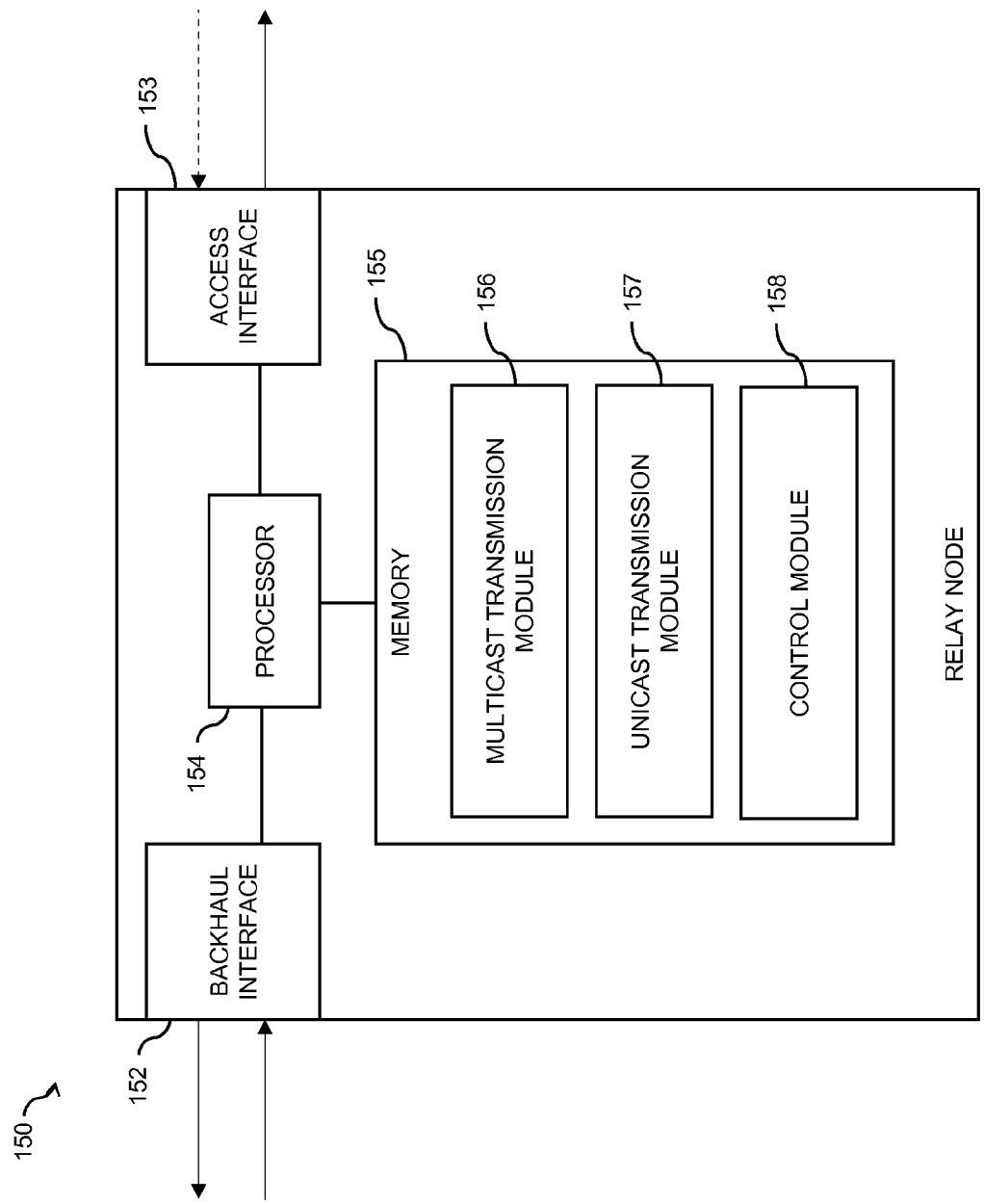
FIG. 11 schematically illustrates structures of a RN according to an embodiment of the invention.

FIG. 11 further illustrates structures of a RN 150 according to an embodiment of the invention. The RN 150 may implement the above-described functionalities of relaying multicast data and support at least the multicast-only operating mode as explained above. Optionally, the RN 150 may additionally support the mixed operating mode as explained above.

In the illustrated example, the RN 150 includes a backhaul interface 152 for communication with the donor base station and an access interface 153 for communication with UEs. The backhaul interface 152 and the access interface 153 may be implemented by a single physical radio interface, e.g., including corresponding shared antennas, receivers, and/or transmitters, or may be implemented by separate physical radio interfaces, e.g., by using dedicated antennas, receivers, and/or transmitters. In the 3GPP LTE scenario, the backhaul interface may correspond to the Un interface. In the concepts as described herein, the backhaul interface 152 may in particular be used to receive multicast data to be forwarded by the RN. In addition, it may also be used to send indications to the donor base station, e.g., an indication that the RN 150 is using the multicast-only operating mode as explained above and/or an indication of restrictions regarding the transmission of control information to the RN 150. In addition, the backhaul interface may also be used to receive control information, e.g., scheduling information or synchronization information for joint transmissions of multicast data. The backhaul interface 152 may be used for other purposes as well, e.g., for receiving DL unicast data to be forwarded by the RN 150 to a UE or for forwarding UL unicast data received from a UE to the donor base station when the RN 150 is in the mixed operating mode, if supported. The access interface 153 may in particular be used to send multicast transmissions with the received multicast data to UEs. Optionally, if the RN 150 additionally supports the mixed operating mode, the access interface 153 may also be used to send unicast data to UEs, to receive unicast data from UEs, to send control information to UEs and/or receive control information from UEs, and to send reference signals to UEs.

Further, the RN 150 includes a processor 154 coupled to the backhaul interface 152 and the access interface 153, and a memory 155 coupled to the processor 154. The memory 155 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 155 includes suitably configured program code to be executed by the processor 154 so as to implement the above-described functionalities of relaying multicast data. More specifically, the memory 155 may include a multicast transmission module 156 so as to implement the above-described forwarding of multicast data. If the RN 150 supports the mixed operating mode, the memory 155 may also include a unicast transmission module 157 so as to implement forwarding of unicast data in the mixed operating mode as explained above. Further, the memory 155 may also include a control module 158 so as to implement various control functionalities, e.g., configuration of radio frames, sending of indications to the donor base station, and/or switching between operating modes.

It is to be understood that the structure as illustrated in FIG. 11 is merely schematic and that the RN 150 may actually include further components which, for the sake of clarity, have not been illustrated, e.g., further interfaces. Also, it is to be understood that the memory 155 may include further types of program code modules, which have not been illustrated. According to some embodiments, also a computer program product may be provided for implementing concepts according to embodiments of the invention, e.g., a medium storing the program code to be stored in the memory 155.

Figure 12:
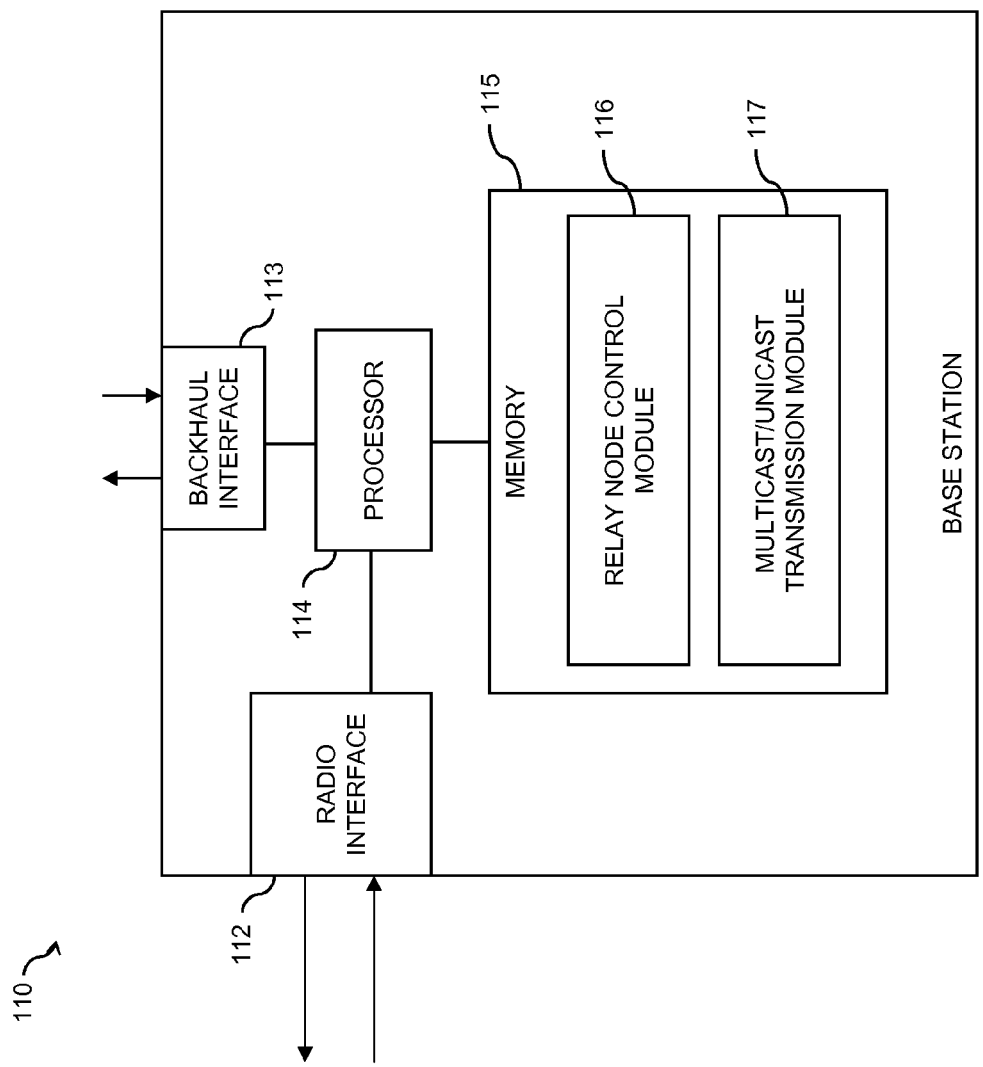
FIG. 12 schematically illustrates structures of a base station according to an embodiment of the invention.

FIG. 12 further illustrates structures of a base station 110 according to an embodiment of the invention. The base station 110 may implement the above-described functionalities of relaying multicast data. As mentioned above, the base station may correspond to an eNB according to 3GPP LTE.

In the illustrated example, the base station 110 includes a radio interface 112 for communication with RNs and UEs, and a backhaul interface 113 for communication with the network, e.g., with the control node 130 as illustrated in FIG. 1 or the MCE 130-1 and the MBMS GW 130-2 as illustrated in FIG. 2. The radio interface 112 may be implemented to include, e.g., corresponding antennas, receivers, and/or transmitters. In the 3GPP LTE scenario, the radio interface operate as the Un interface when the base station 110 communicates with a RN and may operate as the Uu interface when the base station directly communicates with a UE. The backhaul interface 113 is typically a wire-based interface. For example, the backhaul interface may implement the M1 and M2 interfaces as shown in FIG. 2. In the concepts as described herein, the backhaul interface 113 may in particular be used to receive multicast data to be transmitted by the base station 110 to UEs or to be forwarded by the base station 110 to a subordinate RN. The radio interface 112 may in turn be used for forwarding the multicast data to the RN and to accomplish multicast transmissions of the multicast data to UEs. In addition, it may also be used to receive indications from the RN, e.g., an indication that the RN is using the multicast-only operating mode as explained above and/or an indication of restrictions regarding the transmission of control information to the RN. In addition, the radio interface 112 may also be used to send control information to UEs or RNs, e.g., scheduling information or synchronization information for joint transmissions of multicast data. The radio interface 112 may be used for other purposes as well, e.g., for receiving UL unicast data forwarded by a RN 150 or for sending DL unicast data to the RN when the RN is in the mixed operating mode. The radio interface 112 may also be used to send unicast data to UEs, to receive unicast data from UEs, to send system or control information to UEs and/or receive control information from UEs, and to send reference signals to UEs.

Further, the base station 110 includes a processor 114 coupled to the radio interface 112 and the backhaul interface 113, and a memory 115 coupled to the processor 114. The memory 115 may include a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The memory 115 includes suitably configured program code to be executed by the processor 114 so as to implement the above-described functionalities of the donor base station when relaying multicast data. More specifically, the memory 115 may include a relay control module 116 so as to implement various control functionalities, e.g., configuration of radio frames, processing of indications from the RN, appropriate control of transmissions of control information taking into account restrictions at the RN. Further, the memory 115 may include a multicast/unicast transmission module 117 so as to implement the above-described forwarding sending multicast data and sending and/or receiving unicast data.

It is to be understood that the structure as illustrated in FIG. 12 is merely schematic and that the base station 110 may actually include further components which, for the sake of clarity, have not been illustrated, e.g., further interfaces. For example, the base station 110 may also comprise multiple radio interfaces which are similar to the radio interface 112, e.g., to allow for using separate physical interface structures for communicating on the one hand with UEs and on the other hand with RNs, or for allowing to use multipath transmission techniques. Also, it is to be understood that the memory 115 may include further types of program code modules, which have not been illustrated. According to some embodiments, also a computer program product may be provided for implementing concepts according to embodiments of the invention, e.g., a medium storing the program code to be stored in the memory 115.

Figure 13:
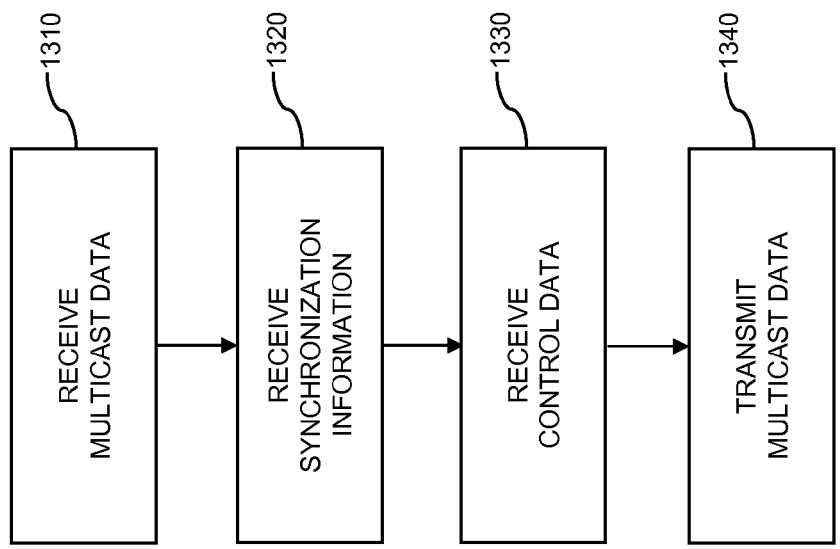
FIG. 13 shows a flowchart for illustrating a method according to an embodiment of the invention.

FIG. 13 shows a flowchart illustrating a method according to an embodiment of the invention. The method may be used to implement the above concepts of relaying multicast data in a RN of a wireless network, e.g., in the RN 150 as explained above. When implementing the method, the RN is configured for transmissions on the basis of a radio frame comprising one or more subframes for unicast transmission and one or more subframes for multicast transmission. If the wireless network is implemented according to 3GPP LTE, the subframes for multicast transmission may be MBSFN subframes. The subframes for unicast transmission may be regular subframes.

At step 1310, multicast data are received by the relay node, e.g., using the backhaul interface 152 of FIG. 11. The subframes for receiving the multicast data, herein referred to as backhaul subframes, are selectable from the subframes for unicast transmission and the subframes for multicast transmission. The multicast data are received from a donor base station, e.g., a base station 110 as explained above. If the wireless network is implemented according to 3GPP LTE, the donor base station may be an eNB. The multicast data are typically intended for multicast transmissions to UEs. These multicast transmissions by the RN may be performed jointly with a base station, e.g., the donor base station or some other base station, and/or with at least one other RN.

At optional step 1320, the RN receives synchronization information from the donor base station. The synchronization information may be used by the RN when performing multicast transmissions jointly with a base station, e.g., the donor base station, or some other base station. The synchronization information may for example define an allocation of transport channels, e.g., of the PMCH, to subframes and/or session start information. Here, it is to be understood that the synchronization information may be transmitted in dedicated messages and/or be transmitted together with the multicast data of step 1310, e.g., in the form of time stamps included in the multicast data.

At optional step 1330, the RN receives control information, e.g., DL or UL scheduling information such as assignments of time and frequency resources, information on a coding scheme to be used, and/or information on a Tx power to be used for transmissions on the backhaul link. The subframes for multicast transmission may each comprise a control region and a multicast region. The control information may be received in a control region of a subframe for multicast transmission, in particular in a subframe used by the RN for the transmission of the multicast data from the relay node, i.e., for a multicast transmission to UEs. In this case a time period for switching between receiving the control information and transmitting the received multicast data may extend only in the control region, only in the multicast region, or both in the control region and the multicast region.

At step 1340, the RN transmits the received multicast data in one or more of the subframes for multicast transmission. As mentioned above, this may be performed jointly with a base station, e.g., the donor base station or some other base station, and/or with at least one other RN. If the wireless network is implemented according to 3GPP LTE, the joint transmission may be implemented by transmitting MBMS signals in MBSFN transmission mode.

In some embodiments, the RN may be provided with a multicast-only operating mode configured to relay the multicast data, but no unicast data, e.g., corresponding to the above multicast-only operating mode or MBMS-only operating mode as explained above. Further, the RN may also be provided with a mixed operating mode configured to relay the multicast data and unicast data, e.g., corresponding to the mixed operating mode as explained above. The method may then also include switching from the mixed operating mode to the multicast-only operating mode and/or vice versa. According to an embodiment, when the RN is using the mixed mode, the subframes for receiving the multicast data from the donor base station are selected from the subframes for multicast transmission. When switching from the mixed operating mode to the multicast-only operating mode, the a handover of UEs involved in transmissions of unicast data by the relay node to a base station, e.g., the donor base station or some other base station, or to another relay node may be initiated. Such handover would typically be initiated by the RN.

Figure 14:
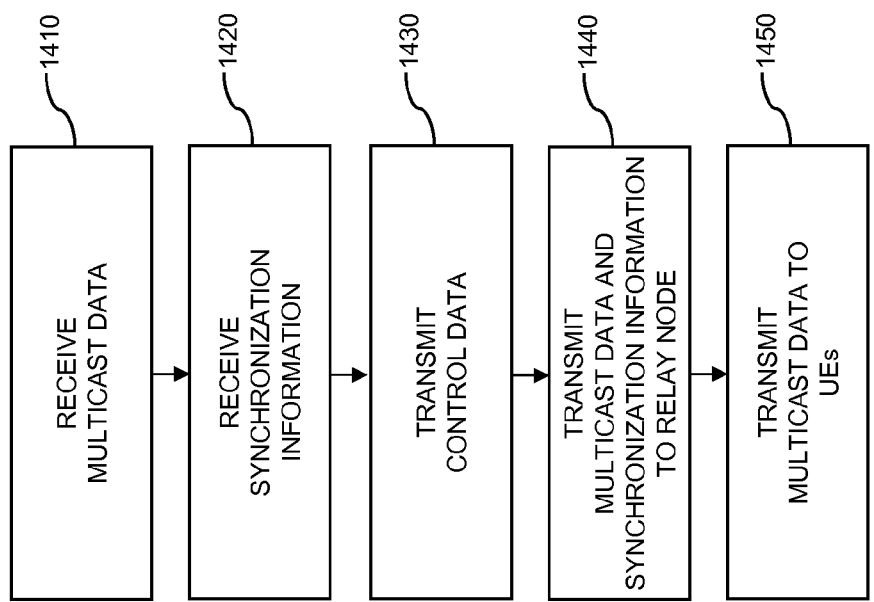
FIG. 14 shows a flowchart for illustrating a further method according to an embodiment of the invention.

FIG. 14 shows a flowchart illustrating a further method according to an embodiment of the invention. The method may be used to implement the above concepts of relaying multicast data in a base station of a wireless network, e.g., in the base stations 110 as explained above. When implementing the method, it is assumed a RN of the wireless network is configured for transmissions on the basis of a radio frame comprising one or more subframes for unicast transmission and one or more subframes for multicast transmission. The base station may be implicitly aware of this radio frame configuration or may receive a corresponding indication from the RN. If the wireless network is implemented according to 3GPP LTE, the subframes for multicast transmission may be MBSFN subframes, and the base station may be an eNB. The subframes for unicast transmission may be regular subframes.

At optional step 1410, multicast data are received by the base station, e.g., using the backhaul interface 113 of FIG. 12. If the wireless network is implemented according to 3GPP LTE, the multicast data may be received from an MBMS GW, e.g., the MBMS GW 130-2 of FIG. 2. Other ways of providing the base station with the multicast data may be used as well. For example, the multicast data could be generated at the base station. The multicast data are typically intended for multicast transmissions to UEs, performed by the base station itself or by the RN. The multicast transmissions may be performed jointly by one or more base stations and/or one or more RNs.

At optional step 1420, synchronization information is received by the base station. If the wireless network is implemented according to 3GPP LTE, the synchronization information may be received from an MCE, e.g., the MCE 130-1 of FIG. 2. Alternatively or in addition, the synchronization information may also be received together with the multicast data, in the form of time stamps included in the multicast data. The synchronization information may be used by the base station and/or by the RN when performing multicast transmissions jointly. The joint transmission may also involve other base stations or RNs. The synchronization information may for example define an allocation of transport channels, e.g., of the PMCH, to subframes and/or session start information.

At optional step 1430, the base station transmits control information to the RN, e.g., DL or UL scheduling information such as assignments of time and frequency resources, information on a coding scheme to be used, and/or information on a Tx power to be used for transmissions. The subframes for multicast transmission may each comprise a control region and a multicast region. The control information may be transmitted in a control region of a subframe for multicast transmission, in particular in a subframe used by the RN for the transmission of the multicast data from the RN, i.e., for a multicast transmission to UEs. As explained above, there may be restrictions regarding the transmission of control information in such subframes. Accordingly, in some embodiments, the method also includes that the base station receives, from the relay node, an indication of restrictions applicable to transmission of control information in the subframes for multicast transmission. The base station may then control the transmission of control information to the relay node on the basis of the received indication.

At step 1440, the multicast data and optionally also the synchronization information are transmitted to the RN. The subframes for transmission of the multicast data to the RN, herein referred to as backhaul subframes, are selectable from the subframes for unicast transmission and the subframes for multicast transmission.

At optional step 1450, the base station may transmit the received multicast data in one or more of the subframes for multicast transmission. As mentioned above, this may be performed jointly with the RN, some other base station and/or some other relay node. If the wireless network is implemented according to 3GPP LTE, the joint transmission may be implemented by transmitting MBMS signals in MBSFN transmission mode.

In some embodiments, the RN may be provided with a multicast-only operating mode configured to relay the multicast data, but no unicast data, e.g., corresponding to the above multicast-only operating mode or MBMS-only operating mode as explained above. Further, the RN may also be provided with a mixed operating mode configured to relay the multicast data and unicast data, e.g., corresponding to the mixed operating mode as explained above. The method may then also include that the base station controls its operations in accordance with the operating mode used by the RN. According to an embodiment, when the RN is using the mixed mode, the base station selects the subframes for transmitting the multicast data to the RN from the subframes for multicast transmission. For this purpose, the base station may receive corresponding indications from the RN. For example, the base station may receive an indication that the RN uses the multicast-only mode and is capable of receiving the multicast data in the subframes for unicast transmission.

It is to be understood that the methods of FIGS. 13 and 14 may be combined with each other, e.g., in a system comprising a RN operating in accordance with the method of FIG. 13 and a donor base station operating in accordance with the method of FIG. 14. Further, it is to be understood that the method steps do not need to be performed in the illustrated order, but may be rearranged or combined as appropriate.

The concepts as described above may be used for allowing standardized, i.e., inter-vendor operation of RNs with a multicast-only operation mode. Since the RN in the multicast-only operating mode may be transparent to UEs, the concepts are also useful to improve the reception of multicast data without requiring any modifications to existing UEs. In some embodiments, it is possible to switch between the multicast-only operating mode and the mixed operating mode depending on the network requirements, thereby efficiently balancing the needs for multicast transmissions and network service on the basis of unicast transmissions. In other embodiments, the mixed operating mode could be omitted. For example, such embodiments could be used where coverage extension for unicast transmission is not needed, but an enhancement of data rates for multicast transmissions is desirable.

It is to be understood that the examples and embodiments as explained above are merely illustrative and susceptible to various modifications. For example, although the above description frequently mentions the example of a wireless network according to 3GPP LTE, the concepts could also be applied in other types of wireless networks. Further, it is to be understood that the above concepts may be implemented by using correspondingly designed software to be executed by a processor of a relay node or base station, or by using dedicated device hardware.

The invention claimed is:

1. A method of relaying multicast data in a wireless network comprising at least one relay node, said relay node being configured for transmissions on the basis of a radio frame comprising one or more subframes for unicast transmission and one or more subframes for multicast transmission, the method comprising:

the relay node receiving, from a base station, multicast data,
  wherein the multicast data is received by the relay node from the base station in one or more subframes selectable from the one or more subframes for unicast transmission and the one or more subframes for multicast transmission,
  wherein, responsive to selecting the one or more subframes for multicast transmission, the relay node is configured to receive the multicast data in the one or more subframes for multicast transmission, and
  wherein, responsive to selecting the one or more subframes for unicast transmission, the relay node is configured to receive the multicast data in the one or more subframes for unicast transmission;
the relay node transmitting the received multicast data in one or more of the subframes for multicast transmission,
  wherein the subframes for unicast transmission comprise subframes configured for unicast transmissions from the base station,
  wherein the subframes for multicast transmission comprise subframes configured for multicast transmissions from the base station,
  wherein the relay node is provided with a multicast-only operating mode during which the relay node is configured to relay the multicast data, but no unicast data, and
  wherein the relay node is further provided with a mixed operating mode during which the relay node is configured to relay the multicast data and unicast data; and
upon switching from the mixed operating mode to the multicast-only operating mode, initiating a handover of mobile terminals involved in transmissions of unicast data by the relay node to the base station, to a further base station, or to a further relay node.

2. The method according to claim 1,
wherein the received multicast data are transmitted jointly with at least one base station and/or at least one further relay node.

3. The method according to claim 2, comprising:
the relay node receiving, from the base station, synchronization information for said joint transmission of the multicast data.

4. The method according to claim 1, comprising:
in the mixed operating mode, selecting the one or more subframes for receiving the multicast data in the relay node from the one or more subframes for multicast transmission.

5. The method according to claim 1,
wherein said one or more subframes for multicast data each comprise a control region (CR) for transmitting control information and a multicast region (MR) for transmitting multicast data, and
wherein the relay node further receives from the base station control information in the control region (CR) of said one or more of the subframes used for transmitting the received multicast data from the relay node.

6. The method according to claim 5,
wherein the control information comprises scheduling information for uplink transmissions from the relay node or for downlink transmissions to the relay node.

7. The method according to claim 5,
wherein a time period for switching between said receiving of the control information and said transmitting of the received multicast data extends only in the control region (CR), only in the multicast region (MR), or both in the control region (CR) and in the multicast region (MR).

8. The method according to claim 1,
wherein the wireless network is configured as a 3GPP LTE network and the subframes for multicast transmission correspond to Multimedia Broadcast Multicast Service Single Frequency Network (MBSFN) subframes.

9. A method of relaying multicast data in a wireless network comprising a relay node, said relay node being configured for transmissions on the basis of a radio frame comprising one or more subframes for unicast transmission and one or more subframes for multicast transmission, the method comprising:
a base station receiving from the relay node an indication that the relay node is capable of receiving multicast data in one or more subframes for unicast transmission; and
the base station transmitting, to the relay node, the multicast data in the one or more subframes selectable from the one or more subframes for unicast transmission and the one or more subframes for multicast transmission.

10. The method according to claim 9, comprising:
the base station transmitting the multicast data jointly with the relay node in one or more of the subframes for multicast transmission.

11. The method according to claim 10, comprising:
the base station transmitting, to the relay node, synchronization information for said joint transmission of the multicast data.

12. The method according to claim 9,
wherein said one or more suhframes for muiticast transmission each comprise a control region (CR) for transmitting control information and a multicast region (MR) for transmitting multicast data, and
wherein the base station further transmits, to the relay node, control information in the control region (CR) of said one or more of the subframes for multicast transmission.

13. The method according to claim 9, comprising:
the base station receiving, from the relay node, an indication of restrictions applicable to transmission of control information in the one or more suhframes for multicast transmission or in the one or more subframes for unicast transmission; and
the base station controlling the transmission of control information to the relay node on the basis of the received indication.

14. The method according to claim 12,
wherein the control information comprises scheduling information for uplink transmissions from the relay node or for downlink transmissions to the relay node.

15. The method according to claim 9,
wherein the wireless network is configured as a 3GPP LTE network and the subframes for multicast transmission correspond to Multimedia Broadcast Multicast Service Single Frequency Network (MBSFN) subframes.

16. A relay node for a wireless network, said relay node being configured for transmissions on the basis of a radio frame comprising one or more subframes for unicast transmission and one or more subframes for multicast transmission, the relay node comprising:
at least one radio interface for communication with a base station and one or more mobile terminals; and
a processor for controlling operations of the relay node, said operations of the relay node comprising:
receiving, via the at least one radio interface, multicast data from the base station, wherein the multicast data is received by the relay node from the base station in one or more subframes selectable from the one or more subframes for unicast transmission and the one or more subframes for multicast transmission,
wherein, responsive to selecting the one or more subframes for multicast transmission, the relay node is configured to receive the multicast data in the one or more subframes for multicast transmission, and
wherein, responsive to selecting the one or more subframes for unicast transmission, the relay node is configured to receive the multicast data in the one or more subframes for unicast transmission;
transmitting, via the at least one radio interface, the received multicast data in one or more of the subframes for multicast transmission,
wherein the subframes for unicast transmission comprise subframes configured for unicast transmissions from the base station,
wherein the subframes for multicast transmission comprise subframes configured for multicast transmissions from the base station,
wherein the relay node is provided with a multicast-only operating mode during which the relay node is configured to relay the multicast data, but no unicast data, and
wherein the relay node is farther provided with a mixed operating mode during which the relay node is configured to relay the multicast data and unicast data; and
upon switching from the mixed operating mode to the multicast-only operating mode initiating a handover of mobile terminals involved in transmissions of unicast data by the relay node to the base station, to a further base station, or to a further relay node.

17. A method of relaying multicast data in a wireless network comprising a relay node, said relay node being configured for transmissions on the basis of a radio frame comprising one or more subframes for unicast transmission and one or more subframes for multicast transmission, the method comprising:
a base station receiving, from the relay node, an indication of restrictions applicable to transmission of control information in the one or more subframes for multicast transmission or in the one or more subframes for unicast transmission; and
the base station transmitting, to the relay node, the multicast data in the one or more subframes selectable from the one or more subframes for unicast transmission and the one or more subframes for multicast transmission,
wherein the base station controls the transmission of control information to the relay node on the basis of the received indication,
wherein the subframes for unicast transmission comprise subframes configured for unicast transmissions from the base station, and wherein the subframes for multicast transmission comprise subframes configured for multicast transmissions from the base station.

18. A base station for a wireless network, wherein the wireless network comprises a relay node, said relay node being configured for transmissions on the basis of a radio frame comprising one or more subframes for unicast transmission and one or more subframes for multicast transmission, the base station comprising:
at least one radio interface for communication with one or more mobile terminals and the relay node; and
a processor for controlling operations of the base station, said operations of the base station comprising:
receiving from the relay node an indication that the relay node is capable of receiving multicast data in one or more subframes for unicast transmission; and
transmitting, to the relay node, the multicast data in the one or more subframes selectable from the one or more subframes for unicast transmission and the one or more subframes for muiticast transmission.

19. The base station according to claim 18,
wherein said one or more subframes for multicast transmission each comprise a control region (CR) for transmitting control information and a multicast region (MR) for transmitting multicast data, and
wherein the base station is configured to transmit, to the relay node, control information in the control region (CR) of said one or more of the subframes for multicast transmission.

* * * * *